Patented Sept. 30, 1930

1,777,158

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

FLEXIBLE WATER-RESISTING ALBUMINOUS ADHESIVE COMPOSITION AND METHOD OF MAKING SAME

No Drawing.   Application filed July 21, 1927.  Serial No. 207,579.

This invention relates to the treating of blood albumen and normally water-resisting inaqueous colloids.

I have found that when using blood albumen in making aqueous dispersions of inaqueous colloids or in treating the natural or artificial dispersions thereof, if the blood albumen either alone or in combination with their inaqueous colloid, is treated to a substance that will have a coagulating or insolubilizing effect on the blood albumen and, when substantially dehydrated will tend to make the blood albumen more water-resisting. Among these agents might be mentioned formaldehyde, para formaldehyde, hexamethylenetetramine, calcium chloride and calcium chloride salts.

Although the normally water-resisting colloids of such as rubber in the crude gum form or the synthetic rubber product or the aqueous dispersion of the synthetic, pure, vulcanized or reclaimed rubber or the natural latex of rubber are the inaqueous colloids preferred in my new composition, other inaqueous and dispersible water-resisting colloids such as resins, tars, etc. may also be used where great flexibility, elasticity or vulcanizable results are not desired.

In making my new composition it is preferable to add the dry blood albumen to water slowly to avoid lumps. The water being moderately cool or considerably below 60 degrees centigrade, as hot water will thicken or coagulate the albumen. The albumen to be used may be the pure blood, but due to other objectionable substances therein and a tendency to decompose it is best to use the albumen obtained from the blood. My invention also includes blood albumens that have come from blood that has been treated with chemicals such as oxalic acid, sodium citrate, potassium citrate, sodium oxalate and the like in order to soften or dissolve the fibrin in the blood and perform other changes in the blood or the albumen thereof so that the adhesive made thereby will be, among other things, stronger and more fluid. The addition of from 1 to 5% or greater of oxalic acid to the fresh blood will break down the fibrin so that the dry albumen obtained therefrom will dissolve in a very small amount of water. However, when blood albumen so derived is added to a normally alkaline substance like rubber latex care should be taken to neutralize any excess acid, as such excess or any acidity may coagulate the solid content of the latex.

As an example of one embodiment of my invention which may be used as a joint or veneer wood glue as well as other purposes will be given:

|  | Parts by weight |
|---|---|
| Blood albumen | 100 |
| Paraformaldehyde | 15 |
| Water (not hot) | 150 |

The albumen is added slowly to the water until dissolved and the paraformaldehyde is then added to the albumen in solution. If the albumen solution should tend to coagulate rubber latex or other aqueous dispersions, such dispersions should be first combined with other water-soluble colloids, besides the albumen. After the insolubilizing agent has acted upon the blood albumen, it may thicken, but will later become fluid on standing. The solution is then combined with the rubber latex, which may be considerably less than the albumen in quantity or considerably more but for a workable wood glue I give the following amount: rubber latex 100 parts by weight.

In order to make the adhesive more economical I may add to the composition,

|  | Parts by weight |
|---|---|
| Casein | 50 |
| Calcium hydroxide | 15 |
| Sodium fluoride | 5 |
| Water | 150 |

When a plastic mass is desired that will be moldable but not possess great adhesive strength or elasticity the following proportions are adaptable:

|  | Parts by weight |
|---|---|
| Chicle substitute (gum paloja) | 50 |
| Blood albumen | 80 |
| Petroleum asphalt | 50 |
| Sodium citrate (for the albumen) | 4 |
| Water | 200 |

The chickle substitute as well as the asphalt may be either melted or dissolved in an organic solvent or dispersed by other means and added to the blood albumen, preferably in solution. In the examples given only the basic adhesive is given but it is to be understood that filling materials such as compounds of zinc, like zinc oxide or stearate, compounds of calcium, magnesium, barium and the like as well as sulphur or sulphur compounds and other vulcanizing and accelerating agents, may be added to the composition. Asbestos, cellulose and cotton fibres may be added to the composition whereby the adhesive quality thereof will bind the fibres together. When the composition is in dry form and the albumen is to be packed for a length of time with an alkaline earth hydroxide like lime, oily substances may be added thereto to avoid dust or lumping when dissolving. Oils like linseed, cottonseed, China wood, castor, light or heavy petroleum or coal tar oils may be added to give oxidizing properties to the composition as well as softening and plastic qualities thereto.

When the latex or other colloid in aqueous dispersion has a tendency to coagulate or economy is an important factor, other water-soluble colloids like starches, modified or pure, and preferably cassava, water-soluble oils, gum arabic, tragacanth or karaya, saponin, Irish moss, animal or marine life glues, water-soluble silicates and colloidal clays like bentonite, and many similar colloidal supporting or dispersing agents or substances.

It may be advisable to add insolubilizing agents (which may be the same agent that will also insolubilize the blood albumen) to act on and make the added water-soluble colloids more water-resisting. Among these agents might be mentioned zinc chloride, potassium chromate, tannic acid or other tannates. The addition of one or two percent (based on dry weight of the insolubilizable colloid) of the insolubilizing agent is generally sufficient, but greater or less amounts may be used.

The compositions herein described and especially the rubber containing compounds are well suited, because the application of heat at vulcanizing temperatures will not only vulcanize the rubber when vulcanizing compounds are present, but the heat also will finish or coagulate any uninsolubilized albumen. In the treating of albuminous materials with an insolubilizing agent the action appears to be primarily one of coagulation, which heat also performs.

The word adhesive as herein used is meant in its broadest meaning and may be of cohesive or adhesive nature in dry or wet form. It may mean a strong glue or a very weak sizing or adhesive coating, to be used as a strong wood glue or as a plastic base to adhere, glue, hold, bind or occlude countless small particles of relatively water-insoluble matter or fibrous material.

While I have herein described some particular compositions embodying my invention and methods of making the same, it is to be understood that the invention is not limited to the precise methods, ingredients or proportions mentioned.

Having thus described my invention, I claim and desire to protect by Letters Patent of the United States:

1. An adhesive composition comprising an aqueous dispersion of rubber, blood albumen and an insolubilizing agent for said blood albumen.

2. An adhesive composition comprising rubber latex, blood albumen and an insolubilizing agent for said blood albumen.

3. An adhesive composition in aqueous dispersion comprising a rubber containing substance, blood albumen, an alkali and an insolubilizing agent for said blood albumen, and to render it more resisting after the removal of the water from the aqueous dispersion.

4. An adhesive composition comprising rubber latex, blood albumen, an alkali and an insolubilizing agent for said blood albumen to render it water-resistant after the removal of the water therefrom.

5. An adhesive composition comprising rubber latex, blood albumen, an insolubilizing agent, ammonia and a water-soluble colloid.

6. An adhesive composition comprising rubber latex, an oil, blood albumen and an insolubilizing agent.

7. An adhesive composition comprising rubber latex, a drying oil, blood albumen and an insolubilizing agent for said albumen.

8. An adhesive composition comprising rubber latex, blood albumen, paraformaldehyde, an alkali and sulphur.

9. An adhesive composition comprising rubber in aqueous dispersion, ammonia, paraformaldehyde, blood albumen and an insolubilizing agent to render the albumen water-resisting, after the removal of the water from the aqueous dispersion.

10. The method of making an adhesive composition which comprises the dissolving of blood albumen in water, treating the solution so made with an insolubilizing agent to act upon said albumen, and then combining the mixture so made with rubber in aqueous dispersion.

11. The method of making an adhesive composition which comprises the dissolving of blood albumen in water, and the treating of said albumen with an alkali and formaldehyde and then adding thereto a normally inaqueous colloidal flexible rubber-like gum substance.

12. The method of making an adhesive composition which consists in treating blood to a modifying agent to act on the fibrin and other substances in the blood whereby a better albumen is obtained therefrom, and to then treat the albumen with an insolubilizing agent to render it water-resisting after dehydration, to combine an alkali therewith and to add thereto rubber latex.

13. The method of making an adhesive composition which comprises the placing of an albuminous substance in a state of aqueous solution, mixing therewith an aqueous dispersion of a normally inaqueous water-resisting flexible rubber-like gum colloid and then treating the aqueous mixture so made with an insolubilizing agent so as to render the said albuminous substance water-resisting after dehydration.

In witness whereof I have hereunto set my hand this 19th day of July, 1927.

ARTHUR BIDDLE.